US012353977B1

(12) United States Patent
Zhou et al.

(10) Patent No.: US 12,353,977 B1
(45) Date of Patent: Jul. 8, 2025

(54) UNMANNED AERIAL VEHICLE IDENTIFICATION METHOD BASED ON BLIND SOURCE SEPARATION AND DEEP LEARNING

(71) Applicant: Hangzhou Dianzi University, Hangzhou (CN)

(72) Inventors: Zhigang Zhou, Hangzhou (CN); Jiangong Ni, Hangzhou (CN); Jingyu Zhao, Hangzhou (CN); Xiaona Xue, Hangzhou (CN); Yejiang Lin, Hangzhou (CN); Dou Pei, Hangzhou (CN); Zhiqun Cheng, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 0 days.

(21) Appl. No.: 19/023,430

(22) Filed: Jan. 16, 2025

(51) Int. Cl.
*G06N 3/04* (2023.01)
*G06N 3/0442* (2023.01)
*G06N 3/048* (2023.01)
*G06N 3/09* (2023.01)
*H04B 7/185* (2006.01)

(52) U.S. Cl.
CPC ........... *G06N 3/0442* (2023.01); *G06N 3/048* (2023.01); *G06N 3/09* (2023.01); *H04B 7/18504* (2013.01)

(58) Field of Classification Search
CPC ........ G06N 3/0442; G06N 3/09; G06N 3/048; H04B 7/18504
See application file for complete search history.

(56) References Cited

U.S. PATENT DOCUMENTS 11,676,367 B1 * 6/2023 Owechko ................ G06T 7/136
720/600

FOREIGN PATENT DOCUMENTS

CN  118566873 A  *  8/2024  ............. G01S 7/411
CN  119149856 A  *  12/2024

OTHER PUBLICATIONS

Shyu et al. "Implementation of Pipelined FastICA on FPGA for Real-Time Blind Source Separation", IEEE Transactions on Neural Networks, vol. 19, No. 6, Jun. 2008, pp. 958-970.*

(Continued)

*Primary Examiner* — Li Wu Chang
(74) *Attorney, Agent, or Firm* — Bayramoglu Law Offices LLC

(57) ABSTRACT

An unmanned aerial vehicle (UAV) identification method based on blind source separation and deep learning is disclosed, in the method, firstly, the one-dimensional radar cross section millimeter wave data set of the UAV is acquired, and the mixed signal is obtained by mixing, and the improved FastICA algorithm is used to separate it. Secondly, the separated signal is converted into a two-dimensional image by data transformation, and the two-dimensional image is augmented, the obtained data set is divided into training set, validation set and test set. Thirdly, establish a UAV classification model based on Improved ResNet18 and train this model on the training set to achieve UAV classification. In the present invention, the training time of the network is not greatly increased while the network identification accuracy is improved, so that it can well complete the UAV type identification, and the design is more reasonable and effective.

6 Claims, 4 Drawing Sheets

(56) References Cited

OTHER PUBLICATIONS

Haut et al. "Hyperspectral Image Classification Using Random Occlusion Data Augmentation", IEEE Geoscience and Remote Sensing Letters, vol. 16, No. 11, Nov. 2019, pp. 1751-1755.*
Nagel, "Types of Drones and UAvS (2025", Jan. 2025, pp. 33, https://www.tytorobotics.com/blogs/articles/types-of-drones?srsltid=AfmBOor8-f4uXhV7SaS_m81ch7FKZP-Lz2Yr7wJKivWLXWfihOVIBnW.*

* cited by examiner

UNMANNED AERIAL VEHICLE IDENTIFICATION METHOD BASED ON BLIND SOURCE SEPARATION AND DEEP LEARNING

CROSS REFERENCE TO THE RELATED APPLICATIONS

This application is based upon and claims priority to Chinese Patent Application No. 202311606892.5, filed on Nov. 29, 2023, the entire contents of which are incorporated herein by reference.

TECHNICAL FIELD

The present invention belongs to the field of signal blind source separation and unmanned aerial vehicle (UAV) identification, and specifically relates to an unmanned aerial vehicle identification method based on blind source separation and deep learning.

BACKGROUND

In contemporary society, unmanned aerial vehicle (UAV) identification has become more and more important with the rapid development and wide application of UAV technology. However, there are some challenges and limitations in the existing UAV identification methods, such as complex and changeable environments, various types and forms of UAVs, etc.

Conventional UAV identification methods are generally based on manually designed feature extraction and classification algorithms, which tend to be sensitive to illumination, angle and scale changes, and require a large number of artificial annotation data for training. Additionally, the conventional methods are difficult to adapt to the new UAV identification requirements due to the various types of UAVs being constantly updated.

Blind source separation is a signal processing technology, that can decompose the complex received signal into multiple source signals, and extract the signal components related to the UAV target. Deep learning is a machine learning method based on a neural network, which can automatically learn features and classify tasks.

The method can identify UAV targets in complex environments efficiently and accurately by combining the blind source separation technology and the depth learning model. The technology has the potential to play an important role in UAV monitoring, aviation safety and other fields, and provide technical support for the development of related fields.

SUMMARY

An objective of the present invention is mainly to address the shortcomings of the above problems, and an unmanned aerial vehicle (UAV) classification method based on blind source separation and deep learning is disclosed in the present invention. An independent single signal is obtained by using an improved fast independent component analysis (FastICA) to unmix the mixed signals. Then one-dimensional millimeter-wave data is converted into a two-dimensional image to increase the feature difference of the data, and the identification accuracy of the network is improved by embedding multi-scale attention mechanism and bidirectional long short-term memory (BiLSTM) network into the residual network.

In order to solve the above technical problems, the technical scheme of the present invention is:

an unmanned aerial vehicle (UAV) classification method based on blind source separation and deep learning, including the following steps:

S1, acquiring one-dimensional radar cross section (RCS) millimeter-wave data sets of eight types of UAV, and obtaining mixed signals by mixing every four types of data sets, then obtaining separated signals by using an improved FastICA algorithm to separate mixed signals.

S2, Converting the separated signals into a two-dimensional image by using a data transformation method; augmenting the two-dimensional image; dividing the obtained data set into a training set, a validation set, and a test set.

S3, Establishing a UAV classification network model based on a ResNet18.

S3-1, Taking ResNet18 as a backbone network, fusing a multi-scale attention module (MSAM) into the ResNet18 network by a parallel embedding method; connecting an additional multi-scale attention module after a rectified linear unit (ReLU) layer in the ResNet18, and in a parallel state with an original residual module, and then summing the two modules as an input of a next layer.

S3-2, Replacing a classifier layer of the ResNet18 network with a bidirectional long short-term memory (BiLSTM) network.

The multi-scale attention mechanism is an MSAM module that enhances meaningful features from multiple scales and suppresses useless features, so as to improve the identification accuracy of the network. The advantage of the multi-scale attention mechanism is that it can make better use of the feature information of different scales, and improve the perception, modeling and generalization ability of the model.

S5, Carrying out training of the UAV classification network model according to set hyperparameters in the training set, and obtaining a network model for accurately realizing the UAV classification.

S6, Applying the UAV classification network model to classify and identify the UAV.

In the above-mentioned technical solution, through step S2, the continuous wavelet transform can convert the one-dimensional data into the two-dimensional image, and the two-dimensional image obtained through the data transform has a richer information expression and visualization effect. Raw data can be augmented by using random occlusion. Through data augmentation, a sample size can be increased, a learning ability of the network can be improved, a risk of over-fitting the network can be reduced, and a robustness of the model can be improved.

Preferably, in step S4, the training method for the convolution neural network model based on the ResNet18 is: setting initial values of the four hyperparameters of the number of iterations, learning rate, batch size, and optimizer, training the UAV classification network model under four hyperparameters until the identification accuracy on the training set is no longer improved, and the loss of training set and validation set is close to zero.

In the above-mentioned technical solution, the training of the model is carried out on the training set according to the set hyperparameters, and a convolution neural network model for accurately identifying the type of UAVs is obtained after the training.

Preferably, the specific method for classifying in step S3 is as follows:

image pre-processing: adjusting an input image to a size and normalized pixel value that matches the input of the model.

Feature extraction: extracting the features of the image in each convolution layer and residual block by inputting the input image into the network with a layer-by-layer forward propagation. Obtaining these features by a convolution operation and an activation function.

Classifier classification: converting an output of a last residual block into a fixed-length feature vector by using a global average pooling operation, and classifying through BiLSTM and fully connected layer (FC), and finally converting the output into a probability distribution of each category by using a Softmax function.

Preferably, the MSAM module includes the convolution layer, Sigmoid layer and ReLU layer connected sequentially.

The present invention has the following characteristics and beneficial effects:

with the above-mentioned technical solution, the whitening operation of the original FastICA is improved in the present invention, so that the similarity between the separated signal and the original signal is improved; the original ResNet18 is improved from two aspects, the training time of the network is not greatly increased while the network identification accuracy is improved, so that it can well complete the UAV type identification, and it is easy to deploy to the actual 5G base station, the design is more reasonable and effective.

BRIEF DESCRIPTION OF THE DRAWINGS

To explain the embodiments of the present invention or the technical solutions in the prior art more clearly, a brief introduction will be made to the accompanying drawings used in the embodiments or the description of the prior art. It is obvious that the drawings in the description below are only some embodiments of the present invention, and those ordinarily skilled in the art can obtain other drawings according to these drawings without creative work.

DETAILED DESCRIPTION OF THE EMBODIMENTS

It should be noted that the embodiments and the characteristics of the embodiments in the present invention can be combined with each other without conflict.

In the above description of the present invention, it is to be noted that the orientation or positional relationship indicated by the terms 'center', 'vertical', 'horizontal', 'up', 'down', 'front', 'back', 'left', 'right', 'vertical', 'horizontal', 'top', 'bottom', 'inside', 'outside', etc. is based on the orientation or positional relationship shown in the accompanying drawings, merely for ease of description and simplification of the description of the present invention, and not to indicate or imply that the referenced device or element must have a particular orientation and be constructed and operative in a particular orientation, and thus may not be construed as a limitation on the present invention. In addition, terms such as 'first', 'second', etc. are used only for descriptive purposes and cannot be understood as indicating or implying relative importance or implicitly specifying the number of technical features indicated. Thus, a feature with 'first', 'second', etc. can explicitly or implicitly include one or more of the features. In the description of the present invention, unless otherwise stated, 'multiple' means two or more.

In the description of the present invention, it should be further noted that, unless otherwise explicitly specified and defined, the terms 'arrangement', 'mounting', and 'connection' should be understood in a broad sense, for example, they may be a fixed connection, a detachable connection, or an integrated connection; maybe a mechanical connection, or an electrical connection; and maybe a direct connection, or an indirect connection via an intermediate medium, or communication inside two elements. For those of ordinary skill in the art, the specific meanings of the above terms in the present invention may be understood according to specific circumstances.

Figure 1:
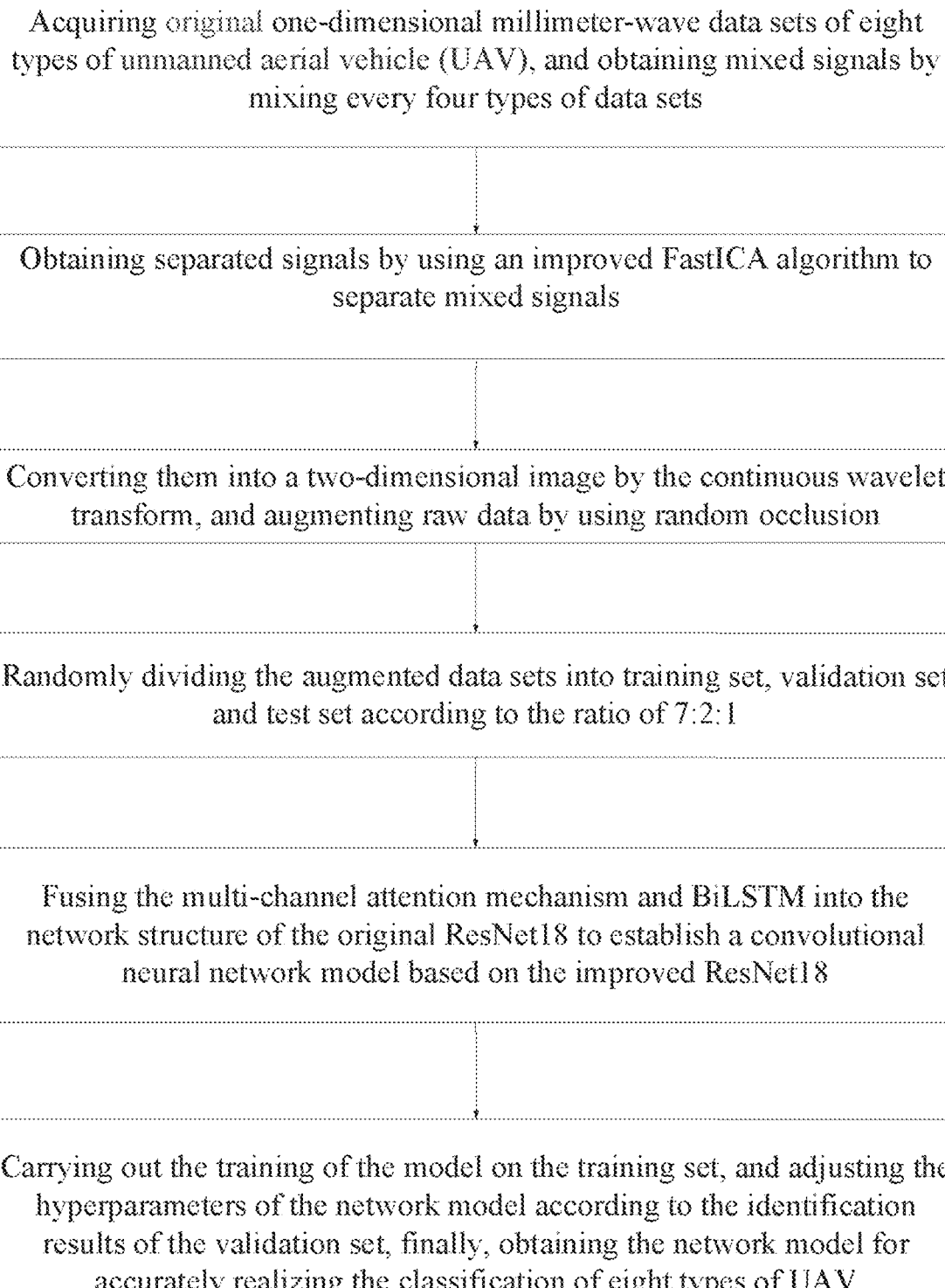
FIG. 1 is an overall flowchart of an embodiment of a UAV classification method based on blind source separation and deep learning of the present invention.

The present invention provides a UAV classification method based on blind source separation and deep learning, as shown in FIG. 1, including the following steps:

step 1, the RCS millimeter-wave data sets of eight types of UAV are acquired, and mixed signals are obtained by mixing every four types of data sets, and separated signals are obtained by using an improved FastICA algorithm to separate mixed signals.

The one-dimensional millimeter-wave data set of the UAV is from the public data set, the specific paper is: Analyzing Radar Cross Section Signatures of Diverse Drone Models at mmWave Frequencies.

The improved FastICA algorithm in step 1 is specifically improved as follows:

As a preprocessing step in the FastICA algorithm, the whitening operation is essential to the reliability and accuracy of the whole algorithm. The algorithm can be more stable by improving the whitening operation. Specifically, an epsilon parameter is used to control the stability of the whitening matrix. When the eigenvalue is small, the problem of numerical instability caused by dividing the small eigenvalue in the whitening matrix can be prevented by adding a smaller constant epsilon (usually 1e-8 or smaller). The formula is:

$$X_{white} = U_{sorted} * \mathrm{diag}(\mathrm{sqrt}(1./(D_{sorted} + \mathrm{epsilon}))) \cdot U_{sorted}^T$$

where $U_{sorted}$ is an eigenvector matrix, $D_{sorted}$ is an eigenvalue vector arranged in descending order, diag denotes a diagonal matrix of construction, and epsilon is an infinite positive number approaching zero.

Step 2: The mean absolute error (MAE) is used to compare the similarity of the waveforms before and after separation, and the separation signal is evaluated.

In step 2, the MAE is calculated, and the specific steps are as follows:

Step 2-1: two waveforms before and after separation are obtained, and denoted as x and y, respectively.

Step 2-2: the length of the two waveforms is determined, and assumed that the length of the two waveforms is N.

Step 2-3: the absolute error value of each sample point is calculated, that is, the absolute value of the difference at the corresponding position, denoted as e (i), i=0, 1, ..., N−1.

$$e(i)=|x(i)-y(i)|$$

Step 2-4: the MAE is calculated, sum all the absolute error values and divide by the total number of samples N;

$$MAE=(1/N)*\Sigma e(i)$$

where Σ denotes the summation operation.

Step 3: the separated signals are converted into a two-dimensional image by using the data transformation method.

In step 3, the data transformation method is a continuous wavelet transform, specifically as follows:

Step 3-1: a mother wavelet function is selected, generally a function symmetric to the origin point. The commonly used mother wavelet functions are Morlet wavelet, Haar wavelet, etc. Morlet wavelet is used in this experiment.

Step 3-2: the selected mother wavelet function carries out the scale transformation and translation, and carries out the convolution operation with the original signal.

$$CWT(a, b) = \int_{-\infty}^{\infty} x(t) \frac{1}{\sqrt{|b|}} \Psi\left(\frac{t-a}{b}\right) dt$$

where x(t) denotes the one-dimensional signal, and CWT (a, b) denotes the results of continuous wavelet transform at time a and scale b. Ψ(t) denotes the mother wavelet function.

Step 3-3: the modulus or amplitude of the convolution results of each scale and translation position are calculated to obtain the two-dimensional image.

Step 3-4: the scale and translation position of the mother wavelet is constantly changed, step 3-2 and step 3-3 are repeated to obtain a series of two-dimensional images with different scales and translation positions. The obtained two-dimensional images are arranged to form the final continuous wavelet transform result.

Step 4: the original data is augmented.

The data augmention method in step 4 is random occlusion, specifically as follows:

a rectangle of adjustable size is used to randomly occlude the image. Random occlusion can not only increase the diversity of data samples, but also increase the robustness of the network model.

Step 5: the obtained data set is randomly divided into training set, validation set and test set according to the ratio of 7:2:1.

Figure 4:
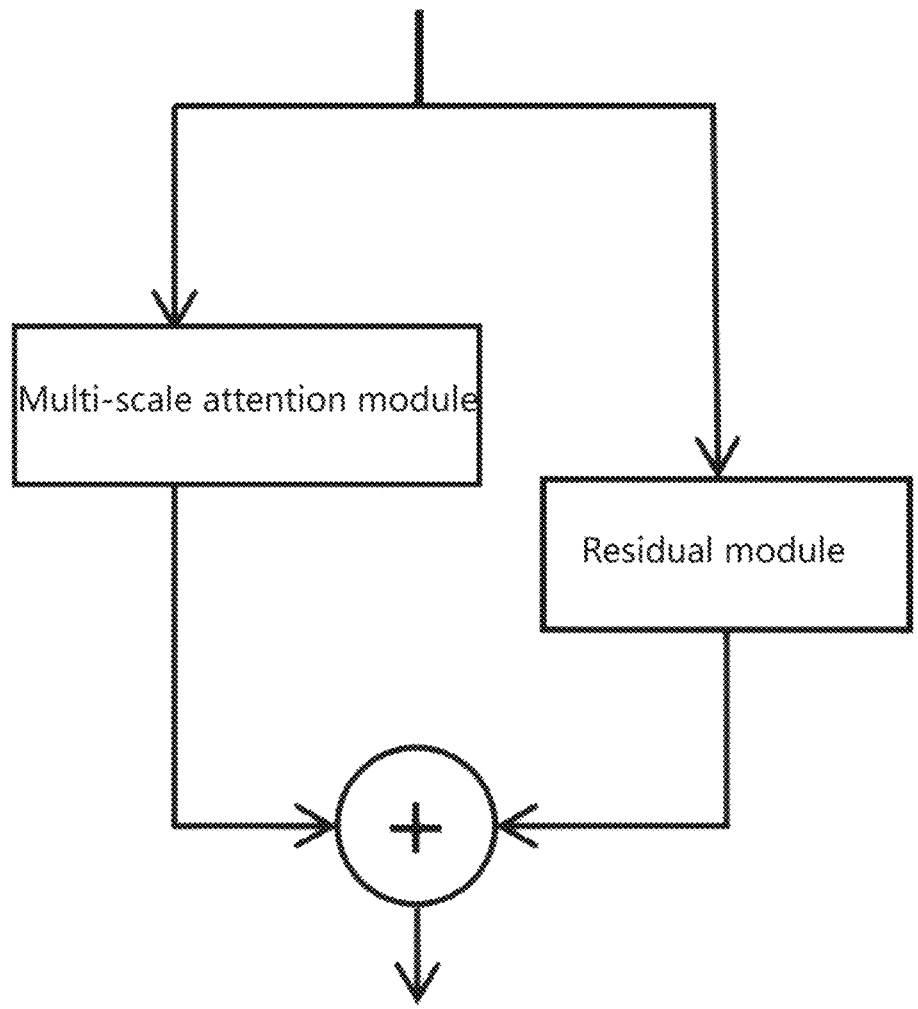
FIG. 4 is an embedding schematic diagram of an attention module of MSAM and a convolutional neural network model based on ResNet18 in an embodiment of the present invention.

Step 6: a UAV classification network model is established based on ResNet18, as shown in FIG. 4, the multi-scale attention mechanism module is embedded in the original ResNet18 network structure in parallel method, and BiLSTM is used to replace the classifier layer of the ResNet18 network, the number of fully connected layer neuronal connections in the backbone network is modified according to the number of categories of the data set.

Understandably, the number of neuronal connections in the fully connected layer of the original ResNet18 is 1000.

In this embodiment, the number of categories of the data set is 8, so the number of modified neuronal connections is 8. Specifically, the OutputSize parameter of the fully connected layer is modified from 1000 to 8.

Specifically, the MSAM module includes the convolution layer, Sigmoid layer and ReLU layer connected sequentially.

In a further setting of the present invention, the convolutional neural network model based on ResNet18 is composed of a preprocessing module, a feature extraction module and a classifier module.

Figure 2:
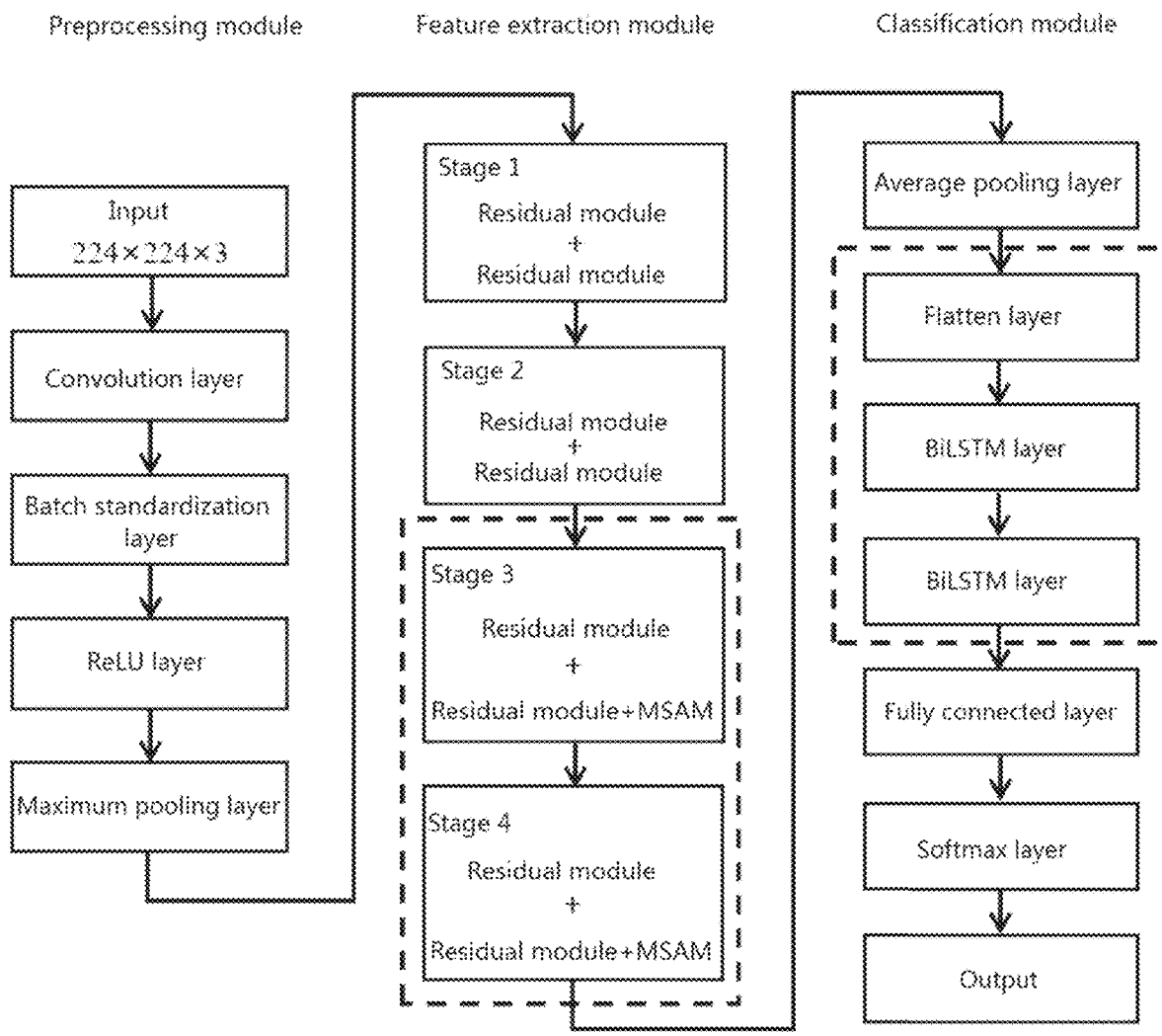
FIG. 2 is a schematic diagram of a convolutional neural network model based on ResNet18 in an embodiment of the present invention.
Figure 3:
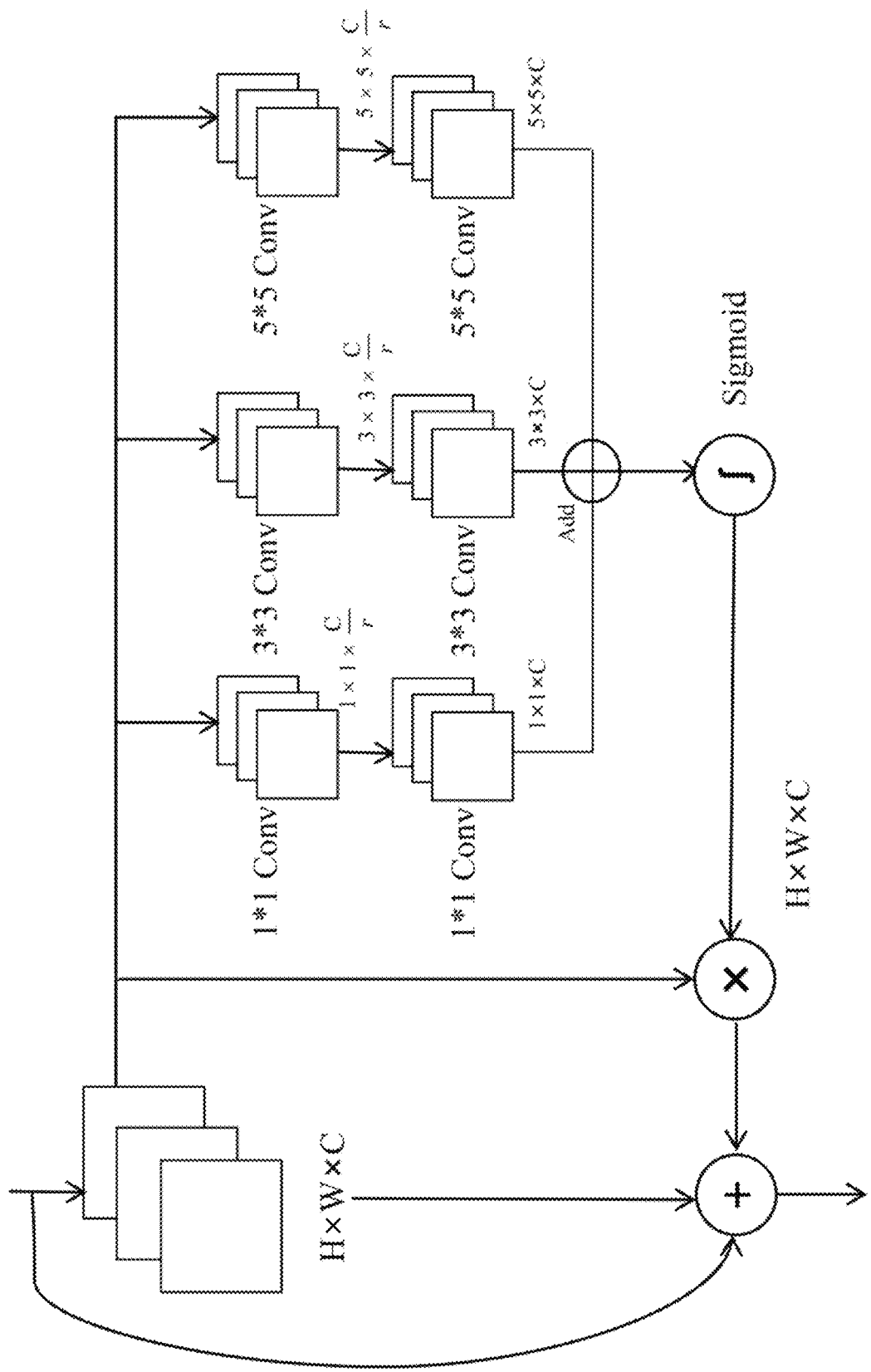
FIG. 3 is a schematic diagram of an attention module of MSAM in an embodiment of the present invention.

Specifically, as shown in FIG. 2 and FIG. 3, the preprocessing module includes a convolutional layer, a batch normalization layer, a ReLU layer, and a maximum pooling layer sequentially, thereby adjusting the input image to a size and normalized pixel value that matches the input of the model.

The feature extraction module includes four stages, and each stage composes of two residual modules, wherein the second residual module in the third and fourth stages is connected to the MSAM module to enhance the feature extraction ability.

The classifier module includes an average pooling layer, Flatten layer, BiLSTM layer, BiLSTM layer, fully connected layer and Softmax layer sequentially.

The output of the last residual block is converted into a fixed-length feature vector by using a global average pooling operation, and classified through BiLSTM and fully connected layers, and finally the output is converted into a probability distribution of each class by using a Softmax function.

$$y_i = \text{softmax}(z_j) = e^{z_j}/\Sigma_j e^{z_j}$$

Where $z_j$ denotes an original score of the $j^{th}$ element in the input vector, and N denotes the dimension of the input vector, that is, the number of categories; e denotes the base number of natural logarithms.

Step 7: the training of the UAV classification network model is carried out according to set hyperparameters in the training set, and the network model for accurately realizing the UAV classification is obtained after the training.

The specific steps of step 7 are:

the initial values of the four hyperparameters of the number of iterations, learning rate, batch size, and optimizer are set. In the embodiment, the number of iterations is set to 50, the learning rate is set to 0.0005, the batch size is set to 32, and the optimizer is set to Adam (Adaptive Moment Estimation).

Step 8: the classification of different types of UAVs are realized.

TABLE 1

The average mean absolute error value of some categories of UAVs before and after the improved FastICA

| Class | FastICA | Improved FastICA |
|---|---|---|
| F450 | 26.80% | 2.97% |
| Heli | 10.23% | 7.01% |
| Hexa | 14.50% | 4.61% |
| M100 | 11.00% | 2.67% |
| Mavic | 19.20% | 6.12% |
| P4P | 8.36% | 1.93% |
| Walkera | 19.80% | 6.05% |
| Y600 | 6.78% | 2.82% |
| Average MAE | 14.58% | 4.27% |

TABLE 2

Results of the ablation experiment

| Type | Accuracy (%) | Increase (%) | Time (min) | Increase (min) |
|---|---|---|---|---|
| Original ResNet18 | 91.44 | | 7.8 | |
| +Multi-scale attention module | 93.29 | 1.85% | 11.2 | 3.4 |
| +BiLSTM layer | 94.68 | 1.39% | 12.5 | 1.3 |

In the present invention, firstly, the original FastICA is improved, as shown in Table 1, it can be seen that after the whitening operation of the original FastICA is improved, the similarity between the separated signal and the original signal is improved; secondly, the original ResNet18 is improved from aspects, as shown in Table 2, it can be seen that after adding the attention module of MSAM and the BiLSTM layer, the identification accuracy is significantly improved, and the training time of the network is not greatly increased while the network identification accuracy is improved, so that it can well complete the UAV type identification, and it is easy to deploy to the actual 5G base station, the design is more reasonable and effective.

The above combined with the attached drawings gives a detailed description of the embodiment of the present invention, but the present invention is not limited to the described embodiment. For the technical personnel in this field, without deviating from the principle and spirit of the present invention, these implementation methods, including various changes, modifications, substitutions and variants of the components, still fall within the protection scope of the present invention.

What is claimed is:

1. An unmanned aerial vehicle (UAV) identification method based on blind source separation and deep learning, comprising the following steps:
    S1, acquiring one-dimensional radar cross section millimeter-wave data sets of eight types of UAV, obtaining mixed signals by mixing two sets of four types of data sets with one set being randomly selected of the eight types of UAV and the other set comprising the rest of the eight types of UAV, and using an improved fast independent component analysis (FastICA) algorithm to separate the mixed signals to obtain separated signals;
    S2, converting the separated signals into a two-dimensional image by using a data transformation method, augmenting the two-dimensional image to obtain a data set, and dividing the data set into a training set, a validation set, and a test set;
    S3, training a UAV classification network model based on a residual network (ResNet18);
    S4, carrying out a training of the UAV classification network model in the training set, and obtaining a network model for realizing UAV classification; and
    S5, applying the UAV classification network model to classify and identify the UAV.

2. The UAV identification method according to claim 1, wherein in step S1, the improved FastICA algorithm is implemented as follows:

$$X_{white} = U_{sorted} * \mathrm{diag}(\mathrm{sqrt}(1./(D_{sorted} + \mathrm{epsilon}))) \cdot U_{sorted}^T$$

wherein $U_{sorted}$ is an eigenvector matrix, $D_{sorted}$ is an eigenvalue vector arranged in descending order, diag denotes a diagonal matrix of construction, and epsilon is an infinite positive number approaching zero.

3. The UAV identification method according to claim 2, wherein in step S2, one-dimensional data is converted into the two-dimensional image by a continuous wavelet transform; and raw data is augmented by using random occlusion.

4. The UAV identification method according to claim 2, wherein step S3 comprises:
    S3-1, taking ResNet18 as a backbone network, fusing a multi-scale attention module (MSAM) into the ResNet18 by a parallel embedding method; and
    S3-2, replacing a classifier layer of the ResNet18 with a bidirectional long short-term memory (BiLSTM) network.

5. The UAV identification method according to claim 4, wherein the S3-1 is implemented as follows: connecting an additional multi-scale attention module after a rectified linear unit (ReLU) layer in the ResNet18, and in a parallel state with an original residual module, and then summing the additional multi-scale attention module and the original residual module as an input of a next layer.

6. The UAV identification method according to claim 5, wherein the MSAM comprises a convolution layer, a Sigmoid layer and a ReLU layer connected sequentially.

* * * * *